United States Patent [19]
Bucksch

[11] 3,744,606
[45] July 10, 1973

[54] DUAL HYDRAULIC OR PNEUMATIC COUPLING

[75] Inventor: Manfred Bucksch, Friedrichshafen, Germany

[73] Assignee: ZF-Borg Warner GmbH, Saarbrucken, Germany

[22] Filed: May 15, 1972

[21] Appl. No.: 253,441

[30] Foreign Application Priority Data
May 25, 1971   Germany............... P 21 25 861.7

[52] U.S. Cl.......... 192/87.11, 192/87.15, 192/18 A
[51] Int. Cl.............................................. F16d 25/10
[58] Field of Search..................., 192/87.11, 87.12, 192/87.15, 13 R, 18 A

[56] References Cited
UNITED STATES PATENTS
| | | | |
|---|---|---|---|
| 3,069,929 | 12/1962 | Hansen.................. | 192/18 A |
| 3,138,964 | 6/1964 | Stockton................. | 192/87.11 |
| 3,554,057 | 1/1971 | Michnay et al........... | 192/87.11 |

Primary Examiner—Benjamin W. Wyche
Attorney—Karl F. Ross et al.

[57] ABSTRACT

Two nested hydraulic or pneumatic couplings, such as a pair of clutches or a clutch and a brake, have interleaved inner and outer annular friction foils carried on three coaxial sleeves. The middle sleeve is rigid with a fluid cylinder welded onto a central shaft on which the inner sleeve is freely rotatable, a portion of the cylinder wall being axially inbent into an annular clearance separating the inner sleeve from the shaft. The cylinder, open toward the foil assemblies, encloses a piston of re-entrant cross-section, roughly matching that of the cylinder wall, which controls the inner foil assembly while extending into the region of the outer foil assembly so that its effective area substantially equals that of a second piston in a confronting fluid cylinder controlling the outer foil assembly.

10 Claims, 1 Drawing Figure

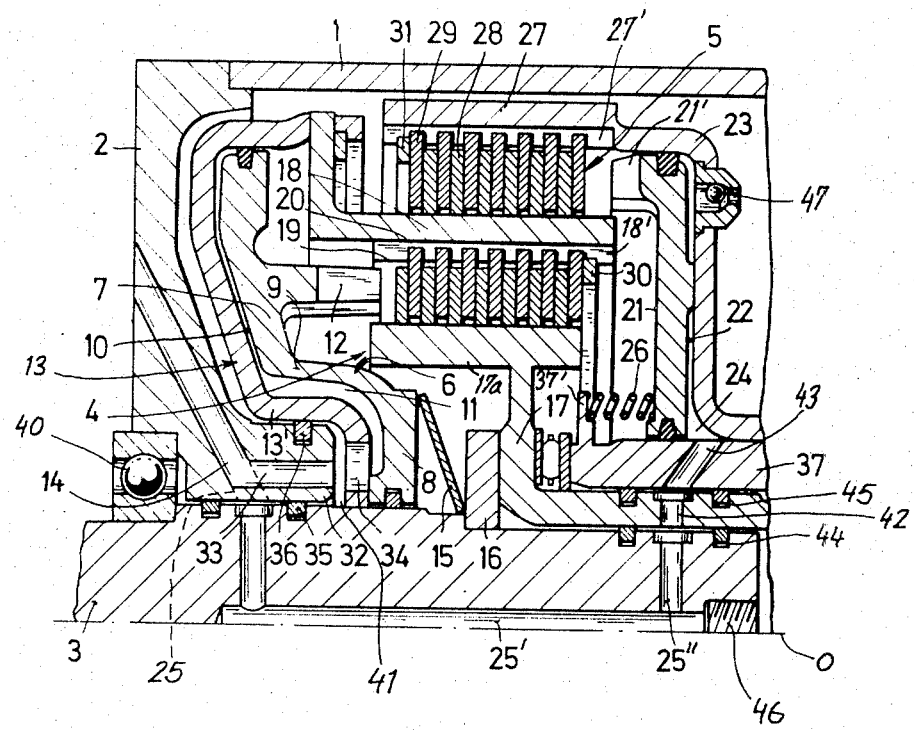

DUAL HYDRAULIC OR PNEUMATIC COUPLING

My present invention relates to a dual hydraulic or pneumatic coupling, i.e., to a unit in which a pair of fluid-actuated coupling devices (clutches and/or brakes) are to be individually and jointly operated.

In commonly owned application Ser. No. 253,440 filed by me on even date herewith together with Hansjörg Dach and Karl Heinz Bordowsky, there has been disclosed a multiple coupling for a power train including a set of planetary gears as used, for example, in automotive transmissions. Typical transmissions of this nature have been described in U.S. Pat. Nos. 3,580,109, 3,592,082, 3,593,599 and 3,600,975. In each of these instances a pair of coaxial power shafts are connected with different elements of a planetary-gear train, e.g. with a pair of sun gears, a sun gear and a ring gear, or a sun gear and a planet carrier. With the aid of fluid-operated (hydraulic or pneumatic) clutches and brakes, which may be collectively referred to as drive-establishing means, either or both of these power shafts may be selectively connected with a common drive shaft in certain modes of operation; in another mode, one of these power shafts may be immobilized.

The system described and claimed in the commonly owned application referred to above includes two clutches and a brake whose coacting friction members are mounted in nested relationship, coaxially with the drive shaft, for independent rotation; associated fluid cylinders and pistons serve for the selective actuation of one or more of these clutch and brake devices in any compatible combination.

The general object of my present invention is to provide a compact cylinder and piston assembly for the selective actuation of two such nested devices, be they a pair of clutches or a clutch and a brake, which is of limited axial length while establishing a large effective area for each piston so as to enable actuation of either device with a relatively low pressure.

A more specific object is to provide a construction of this character which can be conveniently assembled and, if necessary, disassembled for purposes of replacement in case of wear or to fit different operating conditions such as increased or reduced loads.

These objects are realized, in accordance with my present invention, by mounting a first set of coacting annular friction members on an inner sleeve and on an intermediate sleeve and by mounting a second set of such friction members on the intermediate sleeve and on an outer sleeve, both sets of friction members being confronted on one side by a first fluid cylinder rigid with the central drive shaft and on the opposite side by a second fluid cylinder rigid with the outer sleeve; the first fluid cylinder is fixedly secured to the intermediate sleeve whereby the latter rotates with the drive shaft. The inner sleeve has a tubular extension coaxially surrounding the drive shaft while being in turn surrounded by the second fluid cylinder which may have a tubular inner wall surrounding the tubular extension of the inner sleeve; these two nested tubular members, which advantageously are supported on a free extremity of the drive shaft without being keyed thereto, may be positively connected with the two nested power shafts of an associated planetary gearing of the type disclosed in the above-identified prior patents.

In accordance with an important feature of my invention, one of the two pistons (preferably the first piston controlling the inner set of friction members) is of reentrant cross-section with a central cup portion protruding axially into an annular clearance between the drive shaft and the inner sleeve. This cup portion makes available an additional piston area without increasing the axial length of the unit. Advantageously, the corresponding cylinder has a roughly similar cross-section so as to form a hub within the cup portion of the piston, this hub being journaled on a central boss of an end wall of a surrounding housing. Conveniently, the end wall (which may be a detachable lid) contains conduits for supplying high-pressure fluid such as hydraulic oil to the two cylinders, one branch of the supply system extending through the boss and the hub of the proximal cylinder while another branch traverses the drive shaft to reach the distal cylinder. Since the active pressure areas of both pistons are large and have substantially the same outer radius, approximately equaling the radius of the outer sleeve, only a relatively low specific fluid pressure from a common source is required to move either of these pistons against a countervailing spring pressure toward the associated set of friction members in order to drive them against a stop remote from the corresponding cylinders, thereby coupling the intermediate sleeve (and therefore the drive shaft) with either or both of the two other sleeves and their respective extensions.

In this instance, both coupling devices act as clutches to couple the drive shaft to their respective power shafts; a similar construction could be adopted, however, in which the outer sleeve is part of the stationary housing so that the coupling device accommodated between the outer and intermediate sleeves acts as a brake.

The above and other features of my invention will be described in detail hereinafter with reference to the accompanying drawing the sole FIGURE of which shows, in axial cross-section, the upper half of a cylindrical transmission unit embodying the present improvement.

The unit shown in the drawing, associated with a planetary gearing which has not been illustrated but which is assumed to have two coaxial input shafts respectively coupled with a pair of nested tubular members 17 and 37, comprises a cylindrical housing with a shell 1 and a lid 2 forming a detachable end wall. The unit includes a drive shaft 3 which is rotatably journaled in the lid 2 by means of a bearing 40 and which is coaxial with members 17 and 37, their common axis having been indicated at 0. Two coupling devices 4 and 5, both acting as clutches, are selectively actuatable to establish a driving connection between shaft 3 and either or both of tubular members 17 and 37. For this purpose, member 17 is rigid with a sleeve 17a which is the inner one of three coaxial sleeves, being spacedly surrounded by an intermediate sleeve 18 and an outer sleeve 27. Clutch 4 comprises a set of coacting friction members in the form of interleaved annular foils 19 and 20, the foils 19 being axially slidable on the outer surface of sleeve 17a whereas foils 20 are slidable along the inner surface of sleeve 18. Clutch 5 analogously comprises a stack of interleaved foils 28 on sleeve 18 and foils 29 on sleeve 27. Each of these foils is of annular shape and is provided with peripheral teeth fitting into longitudinal grooves of the associated sleeve surface, these grooves being defined by longitudinal ribs which have been illustrated at 18' for the sleeve 18 and at 27' for the sleeve 27. The three sleeves may, in fact, be of crenellated cross-section (as illustrated in the above-identified copending application) so as to form both inner and outer ribs and grooves; in the illustrated embodiment this is relevant only for the intermediate sleeve 18, yet (as described in that other application) the outer ribs of sleeve 27 may be used to support a stack of friction foils partly guided along the similarly ribbed inner periphery of sleeve 1 so as to form a brake by which the sleeve 27 may be immobilized with reference to the housing. The inner ribs of sleeve 17a may be similarly utilized, as likewise described in that other application, to form a detachable connection between sleeve 17a and its extension 17.

According to this invention, I provide a pair of fluid cylinders 13 and 23 confronting the two clutches 4 and 5 from opposite sides, cylinder 13 accommodating a piston 6 whereas cylinder 23 houses a piston 21. Piston 6 is of re-entrant cross-section and has a cup-shaped central portion 8 which protrudes axially into the annular clearance between inner sleeve 17a and shaft 3; this cup-shaped portion 8 is connected by its rim 9 with a generally flat outer portion 7 whose effective surface area 10 approximately equals the corresponding surface area 22 of piston 21. Housing 13 has a hub 13' which spacedly fits into a cup portion 8 and rides on a central boss 32 of housing lid 2. The face of cup portion 8 bears upon a Belleville spring 15 which rests against an abutment 16 rigid with shaft 3; although not so illustrated, this abutment could also have a generally S-shaped cross-section as disclosed in commonly owned application Ser. No. 253,438 of even date filed by me jointly with Hansjörg Dach and Karl Heinz Bordowsky.

Cylinder 13 is fixedly secured to intermediate sleeve 18 as well as to drive shaft 3 (e.g. by welding) so that both the cylinder and the sleeve are rotatably entrained by the shaft. Cylinder 23 is integral with outer sleeve 27 and is joined by any suitable fastening means, such as radial screws, to its tubular extension 37 which has an inner flange 37' forming a stop for an annular array of coil springs 26 (only one shown). Springs 15 and 26 tend to maintain the two pistons in their illustrated retracted positions in which the fluid spaces 11 and 24 between the pistons and their respective cylinders are of minimum volume.

Pressure fluid can be selectively admitted to the spaces 11 and 24 by a conduit system leading from the high-pressure side of a pump, not shown, through a distributor to a pair of oblique channels 14 and 25 disposed in generally parallel but angularly offset relationship in lid 2. The distributor is controlled by a manual selector, e.g. as disclosed in the aforementioned U.S. Pat. No. 3,593,599, to pressurize or to drain either or both of these channels. Channel 14 terminates at an axially extending bore 33 which opens into a space 41 bounded by a pair of annular gaskets 35, 36 on shaft 3 and boss 32, respectively; space 41 communicates with space 11, in any rotary position of cylinder 13, through a port 34 in hub 13'. Channel 25 leads to a central bore 25' in shaft 3 and thence, through a radial extension 25" thereof, to space 24 via passages 42, 43 in tubular members 17 and 37, these members being separated from each other and from shaft 3 by narrow gaps defined by pairs of gaskets 44, 45. Bore 25' is closed at the free end of shaft 3 by a threaded plug 46.

Each piston 6 and 21 is provided with an annular array of axial projections 12, 21' which exert a thrust upon the stack of foils 19, 20 and 28, 29 respectively, when the piston is advanced under fluid pressure. The foils of clutch 4 are thereby driven against a stop 30, remote from cylinder 13, having the form of a split ring snapped into cutouts of ribs 18'; a similar stop 31 for the foils of clutch 5 is formed as a split ring snapped into cutouts of ribs 27'.

Cylinder 23 is shown provided with a check valve 47 whose ball, urged outwardly by the centrifugal force during rotation of that cylinder, partly unblock the associated orifice so as to vent the space 24 in the absence of fluid pressure. As pressure builds up in space 24, the ball obstructs the orifice and causes a leftward move of piston 21 to actuate the clutch 5. A similar check valve, not shown, may also be provided in piston 6 or cylinder 13, as disclosed in the first-mentioned one of the two concurrently filed applications.

The space-saving configuration of piston 6, cylinder 13 and channels 14, 25 makes for a highly compact construction while affording a maximum effective piston area so that low supply pressures can be used. Very little machining is required in making the elements described and illustrated; various part, such as cylinder 13 and piston 6, may be manufactured by deep-drawing from sheet metal or by sinter casting.

I claim:

1. A fluid-actuated coupling comprising:

a shaft;

an inner sleeve, an intermediate sleeve and an outer sleeve spacedly and coaxially surrounding said shaft with freedom of independent rotation;

a first set of coacting annular friction members axially slidable on said inner sleeve and said intermediate sleeve, respectively;

a second set of coacting annular friction members axially slidable on said intermediate sleeve and said outer sleeve, respectively;

a first fluid cylinder rigid with said shaft confronting said first and second sets of friction members from one side, said first cylinder having an outer periphery of substantially the same radius as said outer sleeve provided with a radially inward extension secured to said intermediate sleeve;

a second fluid cylinder rigid with said outer sleeve confronting said first and second sets of friction members from the opposite side;

a first piston in said first fluid cylinder axially displaceable under fluid pressure to drive said first set of friction members against a stop remote from said first cylinder;

a second piston in said second fluid cylinder axially displaceable under fluid pressure to drive said second set of friction members against a stop remote from said second cylinder, said pistons having effective fluid-pressure areas of substantially the same outer radius, one of said pistons being of re-entrant cross-section with a central cup portion protruding axially into an annular clearance between said shaft and said inner sleeve; and conduit means for selectively admitting pressure fluid to both said fluid cylinders to move their pistons toward said sleeves for relatively immobilizing said inner and intermediate sleeves and said intermediate and outer sleeves, respectively.

2. A coupling as defined in claim 1 wherein the fluid cylinder associated with said one of said pistons has a cross-section roughly conforming to said re-entrant cross-section and having a hub within said cup portion.

3. A coupling as defined in claim 2 wherein said conduit means has a branch opening into said hub, the latter being provided with a port leading to said one of said pistons in the region of said cup portion.

4. A coupling as defined in claim 3, further comprising a housing rotatably supporting said shaft and having a central boss projecting axially into said hub while defining therewith a fluid chamber communicating with said port, said branch passing through said boss and terminating at said fluid chamber.

5. A coupling as defined in claim 4 wherein said housing includes a shell surrounding said sleeves and a lid secured endwise to said shell, said boss being integral with said lid.

6. A coupling as defined in claim 4 wherein said associated cylinder is said first fluid cylinder.

7. A coupling as defined in claim 6 wherein said inner sleeve has a tubular extension coaxially surrounding said shaft while being in turn surrounded by said second fluid cylinder, said conduit means having another branch extending partly within said shaft and traversing said tubular extension.

8. A coupling as defined in claim 7 wherein said second fluid cylinder has a tubular inner wall surrounding said extension with a narrow intervening gap communicating with said other branch, said tubular wall having a passage connecting said gap with the interior of said second fluid cylinder.

9. A coupling as defined in claim 8 wherein said shaft is provided with a shoulder inside said clearance and wherein said tubular wall has a peripheral flange axially spaced from said second piston, further comprising first spring means between said abutment and said first piston and second spring means between said flange and said second piston for urging said pistons away from said sleeves.

10. A coupling as defined in claim 6 wherein said first piston is provided with projections bearing upon said first friction means at peripherally spaced locations.

* * * * *

UNITED STATES PATENT OFFICE
CERTIFICATE OF CORRECTION

Patent No. 3,744,606　　　　Dated 10 July 1973

Inventor(s) Manfred BUCKSCH

It is certified that error appears in the above-identified patent and that said Letters Patent are hereby corrected as shown below:

In the heading, line [73], for the name of assignee read -- ZF Getriebe Gesellschaft mit beschrankter Haftung instead of "ZF-BORG WARNER GmbH," .

Signed and sealed this 19th day of November 1974.

(SEAL)
Attest:

McCOY M. GIBSON JR.　　　　　　　C. MARSHALL DANN
Attesting Officer　　　　　　　　Commissioner of Patents